United States Patent
Paulraj et al.

(10) Patent No.: US 12,373,562 B2
(45) Date of Patent: Jul. 29, 2025

(54) SYSTEM LEVEL ROOT OF TRUST (ROT) BINDING AND TRUST ESTABLISHMENT

(71) Applicant: Dell Products, L.P., Round Rock, TX (US)

(72) Inventors: Deepaganesh Paulraj, Bangalore (IN); Anil V. Rao, Cedar Park, TX (US); Akkiah Choudary Maddukuri, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 241 days.

(21) Appl. No.: 18/179,121

(22) Filed: Mar. 6, 2023

(65) Prior Publication Data

US 2024/0303339 A1 Sep. 12, 2024

(51) Int. Cl.
  *G06F 21/57* (2013.01)
  *H04L 9/06* (2006.01)
  *H04L 9/32* (2006.01)

(52) U.S. Cl.
  CPC .......... *G06F 21/572* (2013.01); *H04L 9/0643* (2013.01); *H04L 9/3268* (2013.01); *G06F 2221/034* (2013.01)

(58) Field of Classification Search
  CPC ............. G06F 21/572; G06F 2221/034; G06F 21/101; G06F 21/57; H04L 9/0643; H04L 9/3268; H04W 12/69; H04W 12/71
  See application file for complete search history.

(56) References Cited

U.S. PATENT DOCUMENTS

| | | | |
|---|---|---|---|
| 10,437,495 B1* | 10/2019 | Michaud | G06F 9/4411 |
| 10,796,002 B1* | 10/2020 | Raskin | G06F 21/85 |
| 12,174,758 B2* | 12/2024 | Tsai | G06F 13/1652 |
| 2020/0159940 A1* | 5/2020 | Werner | H04L 9/0894 |
| 2021/0136082 A1* | 5/2021 | Andrews | H04L 63/105 |
| 2022/0108016 A1* | 4/2022 | Nakata | H04L 9/3247 |
| 2022/0124118 A1* | 4/2022 | Bangalore Sathyanarayana | H04L 63/1416 |
| 2024/0211008 A1* | 6/2024 | Cudak | G06F 1/26 |
| 2024/0320322 A1* | 9/2024 | Yao | G06F 21/72 |

* cited by examiner

*Primary Examiner* — Malcolm Cribbs
(74) *Attorney, Agent, or Firm* — Fogarty LLP

(57) ABSTRACT

Systems and methods provide an Information Handling System (IHS), comprising a host processor module and a secure control module. A baseboard management controller executes a process that binds the host processor module to the secure control module using a hash value calculated from characteristics of components of the first host processor module. The process to bind the first host processor module to the secure control module comprises retrieving hardware identity certificates from all SPDM-capable hardware devices in the first host processor module, retrieving firmware measurements from all SPDM-capable hardware devices in the first host processor module, calculating an initial hash value from the hardware identity certificates and the firmware measurements, and storing the initial hash value either in the baseboard management controller or in the security processor.

18 Claims, 3 Drawing Sheets

SYSTEM LEVEL ROOT OF TRUST (ROT) BINDING AND TRUST ESTABLISHMENT

BACKGROUND

The Open Compute Project's (OCP) Datacenter-Modular Hardware System (DC-MHS) sub-project is directed to interoperability between elements of datacenter, edge, and enterprise infrastructure. DC-MHS provides consistent interfaces and form factors among modular building blocks. DC-MHS standardizes a collection of form-factors and supporting ingredients to allow interoperability between different platforms. The Security Protocol and Data Model (SPDM) specification defines messages, data objects, and sequences for performing message exchanges between devices over a variety of transport and physical media. The description of message exchanges includes authentication and provisioning of hardware identities, measurement for firmware identities, session key exchange protocols to enable confidentiality with integrity protected data communication and other related capabilities.

SUMMARY

Embodiments are directed to an Information Handling System (IHS), comprising a first host processor module configured to host one or more processors and at least one memory, and a secure control module configured to host a baseboard management controller and a security processor. The baseboard management controller comprises at least one processor coupled to the at least one storage device. The at least one storage device has program instructions stored thereon that, upon execution by the at least one processor, cause the baseboard management controller to execute a process that binds the first host processor module to the secure control module using a hash value calculated from characteristics of components of the first host processor module. The process to bind the first host processor module to the secure control module comprises retrieving hardware identity certificates from all SPDM-capable hardware devices in the first host processor module, retrieving firmware measurements from all SPDM-capable hardware devices in the first host processor module, calculating an initial hash value from the hardware identity certificates and the firmware measurements, and storing the initial hash value either in the baseboard management controller or in the security processor.

The hardware identity certificates are retrieved using an SPDM Get_Certificate request message sent by the baseboard management controller. The firmware measurements are retrieved using an SPDM Get_Measurements request message sent by the baseboard management controller. The SPDM-capable hardware devices in the first host processor module comprise one or more of: a processor, a memory, and a smart device.

The baseboard management controller, after calculating the initial hash value, sets a bound mode indicating that the secure control module is bound to the first host processor module.

Upon power-on of the IHS at a user site, the baseboard management controller retrieves hardware identity certificates and firmware measurements from SPDM-capable hardware devices in a current host processor module, recalculates a new hash value from the hardware identity certificates and the firmware measurements, retrieve the stored initial hash value from the baseboard management controller or the security processor, and determines whether the new hash value and the initial hash value match. If the new hash value and the initial hash value match, then the baseboard management controller allows a host operating system of the IHS to boot.

If the new hash value and the initial hash value do not match, then the baseboard management controller sets an unbound mode indicating that the secure control module is not bound to a known host processor module and performs recovery actions. The recovery actions are based on a user-configured security policy. The security policy may include prevents the IHS from booting, clearing an assigned IHS license, setting a base IHS license, erasing some or all memory devices, clearing server configuration settings, and/or clearing identity module contents.

The baseboard management controller perform recovery actions, including encrypting current internal configuration data using a hardware identity certificate, and storing the encrypted configuration data at the baseboard management controller or at the security processor, such as in an internal hidden memory partition. The internal configuration data comprises one or more of credentials, licenses, personality modules, and security certificates. The baseboard management controller then clears all internal configuration data, and resets configurations to default values.

The baseboard management controller, upon power-on of the IHS after the secure control module has been reattached to the first host processor module, retrieves stored encrypted configuration data, decrypts the encrypted configuration data using the hardware identity certificate, restores the decrypted configuration data to hardware devices, and resets the bound mode indicating that the secure control module is bound to the first host processor module. The baseboard management controller determines that the secure control module has been reattached to the first host processor module if the new hash value matches the initial hash value.

BRIEF DESCRIPTION OF THE DRAWINGS

The present invention(s) is/are illustrated by way of example and is/are not limited by the accompanying figures. Elements in the figures are illustrated for simplicity and clarity and have not necessarily been drawn to scale.

DETAILED DESCRIPTION

Modular server architectures give cloud service providers a variety of compute choices to meet market and business conditions, offer flexible configurations, and deliver innovative solutions. The Datacenter-Modular Hardware System (DC-MHS) provides interoperability between datacenter, edge, and enterprise infrastructure using consistent interfaces and modular building blocks. DC-MHS standardizes various Host Processor Module (HPM) form factors and provides supporting elements for interoperability of HPMs across various platforms. The HPM is managed by a Datacenter Secure Control Module (DC-SCM), which is designed to enable a common management and security infrastructure across platforms within a data center. The interface between the DC-SCM and the HPM is referred as the Datacenter-Secure Control Interface (DC-SCI).

The HPM is a traditional CPU-memory device with the Baseboard Management Controllers (BMC) and security functions moved to the DC-SCM. HPMs are not limited to a standard processor architecture and can apply any processor architecture utilizing management and security features.

Figure 1:
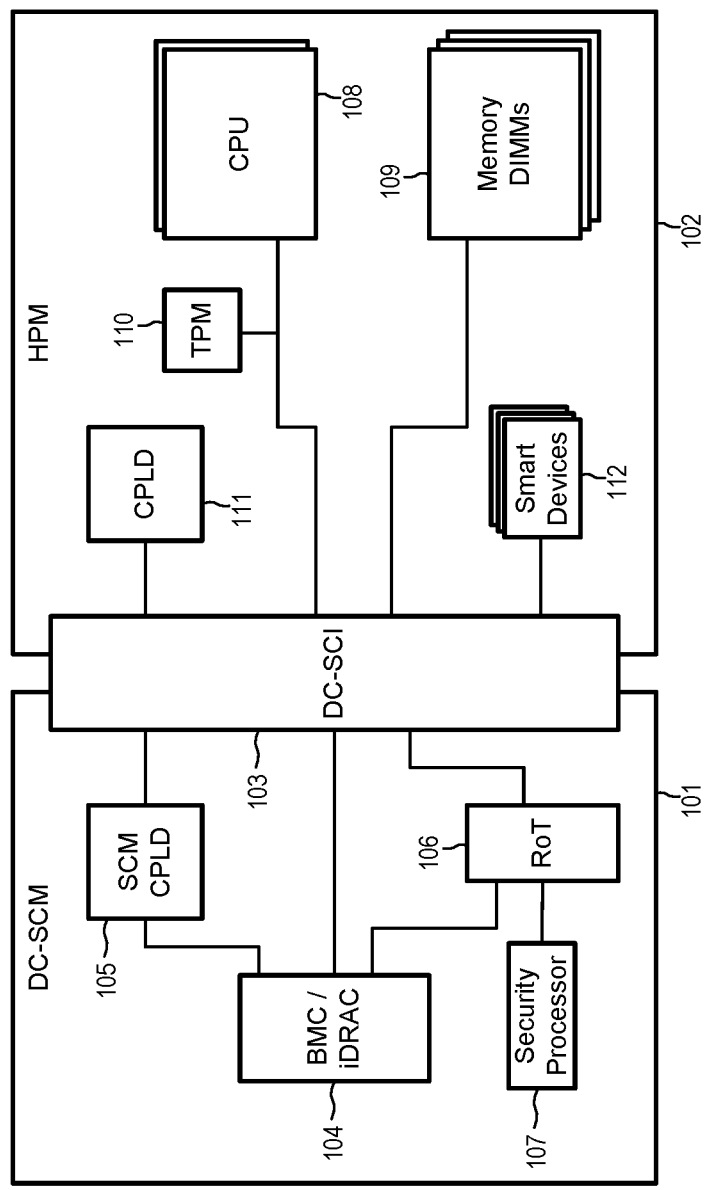
FIG. 1 is a block diagram illustrating multi-node building blocks of a Datacenter-Modular Hardware System.

FIG. 1 is a block diagram illustrating multi-node building blocks of a DC-MHS. DC-SCM 101 is coupled to HPM 102 via DC-SCI 103. The DC-SCM 101 consists of a BMC 104, which is a specialized service processor that monitors the physical state of the server. As a non-limiting example of a BMC 104, the integrated Dell Remote Access Controller (iDRAC) from DELL, INC. is embedded within DELL® PowerEdge servers and provides functionality that helps information technology (IT) administrators at a remote operations centers deploy, update, monitor, and maintain servers with no need for any additional software to be installed.

A complex programmable logic device (DC-SCM CPLD) 105 contains application specific logic and a high-speed and scalable Low-voltage differential signaling Tunneling Protocol & Interface (LTPI). A Roots of Trust (RoT) Security Processor 106 is responsible for attesting the BMC, BIOS, and/or other firmware images on the system. Security Processor 107 stores credentials, licenses, security certificates, and configuration hash values for use in establishing bindings or trust between system components.

HPM 102 represents a general form factor that allows for maximum input/output (I/O) of CPUs 108 in the accessible slots. HPM 102 also includes memory or Dual In-line Memory Modules (DIMMs). The HPM 102 form factor does not require a specific CPU 108 or memory 109 technology. Various HPM 102 form factors support different numbers of CPUs 108 and memory slots 109. The HPM specifications are adapted to allow multiple generations of compute core designs to fit into the form factor specification so that chassis and system designs can be reused as desired. The memory slots 109 may have minimum memory loaded, such as one DIMM per channel.

Trusted Platform Modules (TPM) 110 provide hardware-based, security-related functions for CPUs 108 through integrated cryptographic keys. CPLD 111 supports data exchange between DC-SCM CPLD 105 and HPM 102 using LPTI. In other configurations, HPM 102 may include other hardware components (not shown), such as memory devices, graphics processing units (GPU), peripheral I/O, etc.

HPM 102 may also include one or more smart devices 112, such as a Smart Network Interface Card (NIC), which is a programable device used to improve data center networking performance, security, features, and flexibility. Other smart devices 112 may include, for example, data processing units (DPU) and infrastructure processing units (IPU).

DC-MHS provides a family of specifications to enable interoperability between datacenter and enterprise infrastructure by providing consistent interfaces and form factors among modular building blocks. For example, the Open Compute Project® is developing following HPM specifications. The Modular Hardware System FulL Width Specification (M-FLW), which is an HPM form factor specification that is optimized for using the full width of a standard rack-mountable server. The Modular Hardware System Partial Width Density Optimized Specification (M-DNO), which is an HPM specification that is targeted to partial width, such as half-width or three-quarters-width, form factors.

The DC-SCM design simplifies the deployment of HPMs and increases the efficiency for time to market deployment for new systems. The DC-SCM has a standardized pinout and definition, which provides common boot, monitoring, control, and remote debug for diverse platforms.

DC-SCI 103 supports several PCIe bus options between DC-SCM 101 and HPM 102, including PCIe Gen 2.0 up to PCIe Gen 5.0 x1 interface, SPI interfaces, NC-SI RMII-based transport (RBT) interface, LTPI, eSPI bus, and I2C/I3C bus among others.

DMTF (formerly known as the Distributed Management Task Force) creates open manageability standards including the SPDM standard, which enables authentication, attestation, and key exchange to enable and enhance infrastructure security. SPDM defines messages, data objects, and sequences for performing message exchanges between devices over a variety of transport and physical media. The description of message exchanges includes authentication and provisioning of hardware identities, measurement for firmware identities, session key exchange protocols to enable confidentiality with integrity protected data communication and other related capabilities.

Data center administrators require components to establish trust, and to reestablish trust over time, with other components before securely communicating. SPDM provides an authentication mechanism to establish trust between two endpoints. SPDM enables the creation of a session to exchange secured messages between the endpoints. The components may include encompass a number of component types, including PCIe adapters, BMCs, authentication components, CPUs, and components that are attached over I2C or other buses. SPDM enables authentication and secure communication by retrieval of a public key certificate from a component and using a protocol to challenge the component to prove that it is the component whose identity is uniquely described by that certificate. SPDM allows retrieval of a signed measurement payload of mutable components from a component. The measurements may represent a firmware revision, component configuration, the Root of Trust for Measurements, hardware integrity, etc. SPDM provides negotiation of session keys with a component, thereby enabling secured message exchanges with that component.

The Platform Management Components Intercommunication (PMCI) working group of the DMTF prepared the Security Protocol and Data Model (SPDM) Specification (DSP0274) version 1.2.1 dated Jun. 23, 2022, defines messages, data objects, and sequences for performing message exchanges between devices over a variety of transport and physical media. The SPDM Specification sets forth a messaging protocol that defines a request-response messaging model between two endpoints to perform the message exchanges outlined in SPDM message exchanges. The content of the Security Protocol and Data Model (SPDM) Specification (DSP0274) version 1.2.1, including the SPDM message exchanges, are hereby incorporated by reference herein in its entirety.

Figure 2:
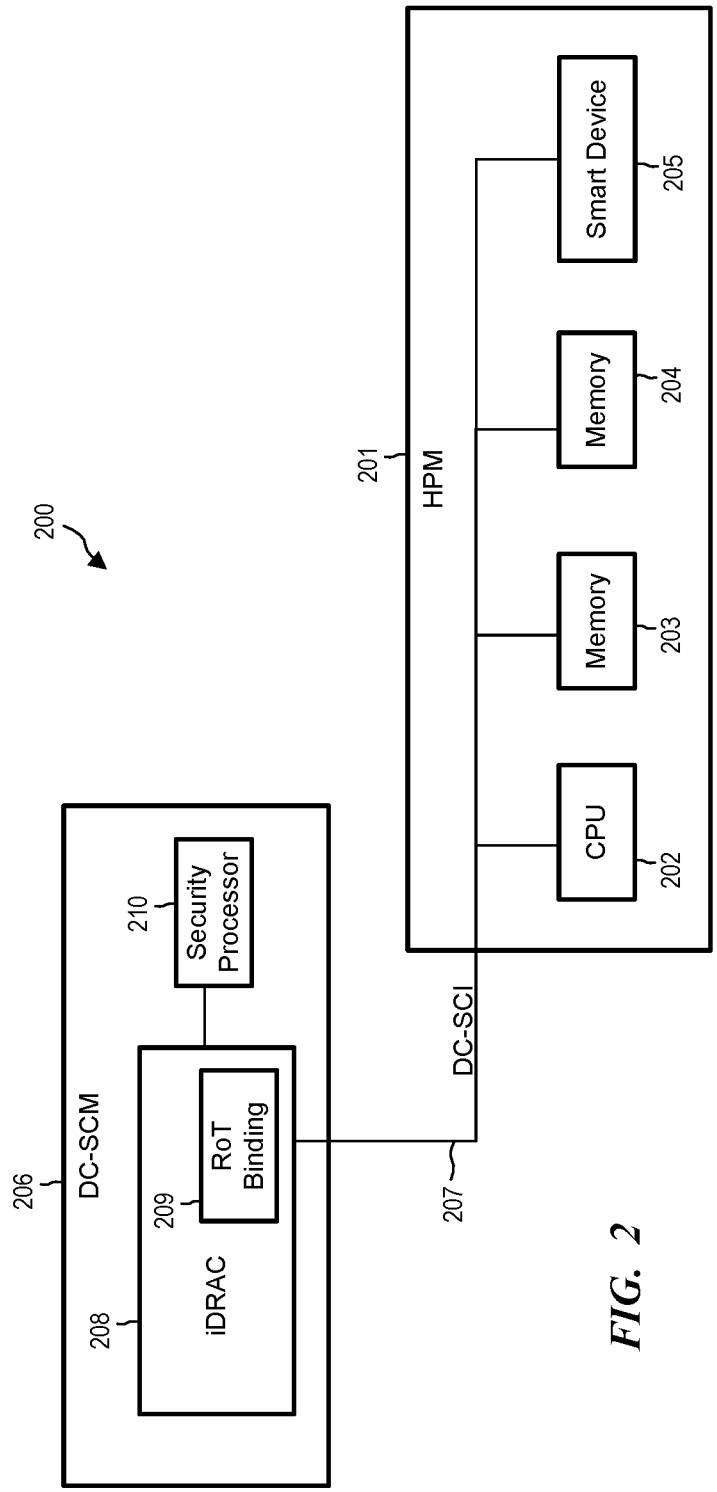
FIG. 2 is a block diagram illustrating elements of a data center system, such as components of a server or an Information Handling System.

FIG. 2 is a block diagram illustrating elements of a data center system 200, which may be components of a server chassis or an Information Handling System (IHS), for example. HPM 201 comprises compute elements, such as a CPU 202, various memory devices 203, 204, and smart device 205, such as a SmartNIC, DPU, or IPU. HPM 201 is in communication with DC-SCM 206 via a connector, bus, or interface, such as DC-SCI 207. DC-SCM 206 includes an iDRAC 208 or other remote access controller or baseboard management controller (BMC). iDRAC 208 includes RoT Binding daemon 209, such as a background software application or process running on iDRAC 208. DC-SCM 206 also includes a security processor 210 stores credentials, licenses, security certificates, and configuration hash values for use in establishing bindings or trust between system components.

In existing servers, a single motherboard holds all of the compute, memory, and management components, such as the CPUs, BMC, memory, and peripheral interfaces. Unlike existing servers, where the BMC is integrated on a processor motherboard and cannot be easily moved to another system, DC-SCM 206 is pluggable and can be moved to a new server and new HPM 201 relatively easily. Because the DC-SCM 206 could be removed from one chassis and plugged into another chassis, it is easy to move DC-SCM 206 from one server to another or moving one IHS to another, for example. If a user has access to the BMC on one chassis, then the user could remove the DC-SCM (along with the BMC) and insert the DC-SCM (and BMC) into another chassis. Because the user has the necessary BMC credentials, the user will get unauthorized access to all of the compute and memory components on the second chassis. DC-SCM 206 is provisioned with various server configurations, licenses, personality modules, and security certificates, then it can be removed and reinserted into another server or chassis to provide unauthorized access, or DC-SCM 206 may get provisioned to an incorrect server or chassis.

System 200 allows a data center to discover, provision, and activate optional features of SPDM-capable hardware, such as CPU 202, memory 203, 204, and smart device 205. As defined in the SPDM Specification, iDRAC 208 may act as a Requester endpoint that sends SPDM messages to other endpoints, such as CPU 202, memory 203, 204 and other smart devices 205, which act as Responders. A certificate chain is supported by SPDM. The certificate chain contains at least one certificate that includes hardware identity information for the SPDM-capable devices. The hardware identity information should be present in a device certificate and is identified by a hardware identity object identifier.

In one embodiment, system 200 prevents unauthorized access to HPM 201 in the DC-MHS environment by establishing a system-level RoT binding and trust establishment using iDRAC 208 in DC-SCM 206. iDRAC 208 accumulates a hashing of SPDM identify certificates and firmware measurements for HPM 201 devices such as CPU 202, memory devices 203, and smart device 205 against the security processor 210. iDRAC 208 ensures that the host system boots only after validating the binding between DC-SCM 206 and HPM 201, which may be referred to as an HPM-to-DC-SCM BOUND mode.

When DC-SCM 206 is inserted into another chassis and coupled to a different HPM (not shown), then the binding between HPM 201 and DC-SCM 206 is broken and iDRAC 208 triggers a self-recovery. iDRAC 208 may back up an original or current system configuration in a hidden partition in iDRAC 208 or security processor 210. iDRAC 208 then initiates a secure reset to its default configuration. iDRAC 208 may also initiate a secure erase of the entire system configuration based on a user-configured secure policy. This may be referred to as an HPM-to-DC-SCM UNBOUND mode or a RESTRICTED mode.

When the DC-SCM 206 is reinserted into the original chassis and/or connected to the original or known HPM 201, then the binding between HPM 201 and DC-SCM 206 is reestablished. The binding between HPM 201 and DC-SCM 206 becomes valid again, and iDRAC 208 restores the previous system configurations by retrieving them from the hidden partition. This is a return to the HPM-to-DC-SCM BOUND mode.

In the DC-MHS environment, a BMC, such as iDRAC 208, is part of the DC-SCM 206 component and performs SPDM discovery and inventory for the system 200. DC-SCM 206 may be coupled to an HPM, such as HPM 201, in several ways. For example, DC-SCM 206 and HPM 201 may be appropriately paired during an original manufacturing process for system 200 or during an authorized field installation or repair by a field engineer. In other situations, DC-SCM 206 and HPM 201 may be inappropriately paired during an unauthorized data center repair/replacement or by a malicious user attempting to access HPM 201 without authorization.

During a manufacturing process or an initial OEM configuration, DC-SCM 206 may be place in a factory mode. When the factory mode is active, iDRAC 208 retrieves hardware identity certificates from all of the SPDM-capable hardware devices present in HPM 201, such as CPU 202, memory devices 203, 204, and smart device 205. The hardware identity certificates may be obtained using the SPDM Get_Certificate request message sent by iDRAC 208, which causes the hardware devices to respond with an SPDM Certificate response message.

iDRAC 208 also obtains firmware measurements from the hardware devices present in HPM 201 using the SPDM Get_Measurements request message, which causes the hardware devices such as CPU 202, memory devices 203, 204, and smart device 205, to respond with an SPDM Measurements response message. The Get_Measurements request message is used to retrieve measurements of mutable firmware components that the recipient endpoint is executing (firmware measurements).

iDRAC 206 then calculates an overall hash value for all of the hardware identity certificates and firmware measurements for the components of HPM 201. iDRAC 206 stores the hash value either locally or communicates the hash value to security processor 210 to store the hash value securely. iDRAC 206 then sets the mode as HPM-to-DC-SCM BOUND mode. After manufacturing is completed at the OEM, system 200 is delivered to and installed at a customer site, such as a data center.

In some embodiments, an authorized field engineer may also initiate the factory mode to reset the hash value when a DC-SCM or HPM is repaired or replaced.

At the customer site during normal operation, iDRAC 206 allows a user, such as a data center administrator, to configure the various credentials, licenses, personality modules (e.g., ports for data traffic), security certificates, etc. On system power-on, iDRAC 208 again obtains the hardware identity certificate and firmware measurements from the hardware devices 202-25 present on HPM 201. iDRAC 208 recalculates the overall hash value and fetches the stored hash value (i.e., the factory-mode hash value) from a local store or from security processor 210. If both hash values match, then iDRAC 208 allows the host operating system to boot.

If DC-SCM 206 is inserted into different HPM (not shown), then the hash values will not match. In that case, iDRAC 208 will prevent the host operating system from booting and will instead perform recovery actions, which are based on a user-configured security policy.

In one recovery arrangement, iDRAC 208 backs up the current internal configurations for system 200, such as various credentials, licenses, personality modules, and security certificates, and encrypts them using the hardware identify certificate. iDRAC 208 then stores the encrypted configuration values in an internal hidden memory partition or to security processor 210. iDRAC 208 then clears all of the internal configuration values and resets iDRAC configurations to default values. iDRAC 208 resets the mode to HPM-to-DC-SCM UNBOUND mode or to RESTRICTED mode.

If DC-SCM 206 is later reconnected to the original HPM 201, then both hash values will match during the startup sequence. When the hash values match, iDRAC 208 fetches the stored configurations, such as the various credentials, licenses, personality modules, and security certificates, from the internal hidden partition or from security processor 210. iDRAC decrypts the stored configurations using the hardware identity certificate and restores them to the system. iDRAC 208 then sets the mode to HPM-to-DC-SCM BOUND mode again.

Examples of various user-configured security policies include (i.e., resulting action by iDRAC 208 when hash values do not match): not allowing the server 200 to boot (e.g., locking the system), clearing any licensing and setting a base license (e.g., allowing only basic/generic system operations and access), secure erasure of all the Solid State Drives (SSD), Hard Disk Drive (HDD), and non-volatile DIMM (NVDIMM) (e.g., erase memories 203, 204), clear server configuration settings, and/or clear the identity module contents.

Figure 3:
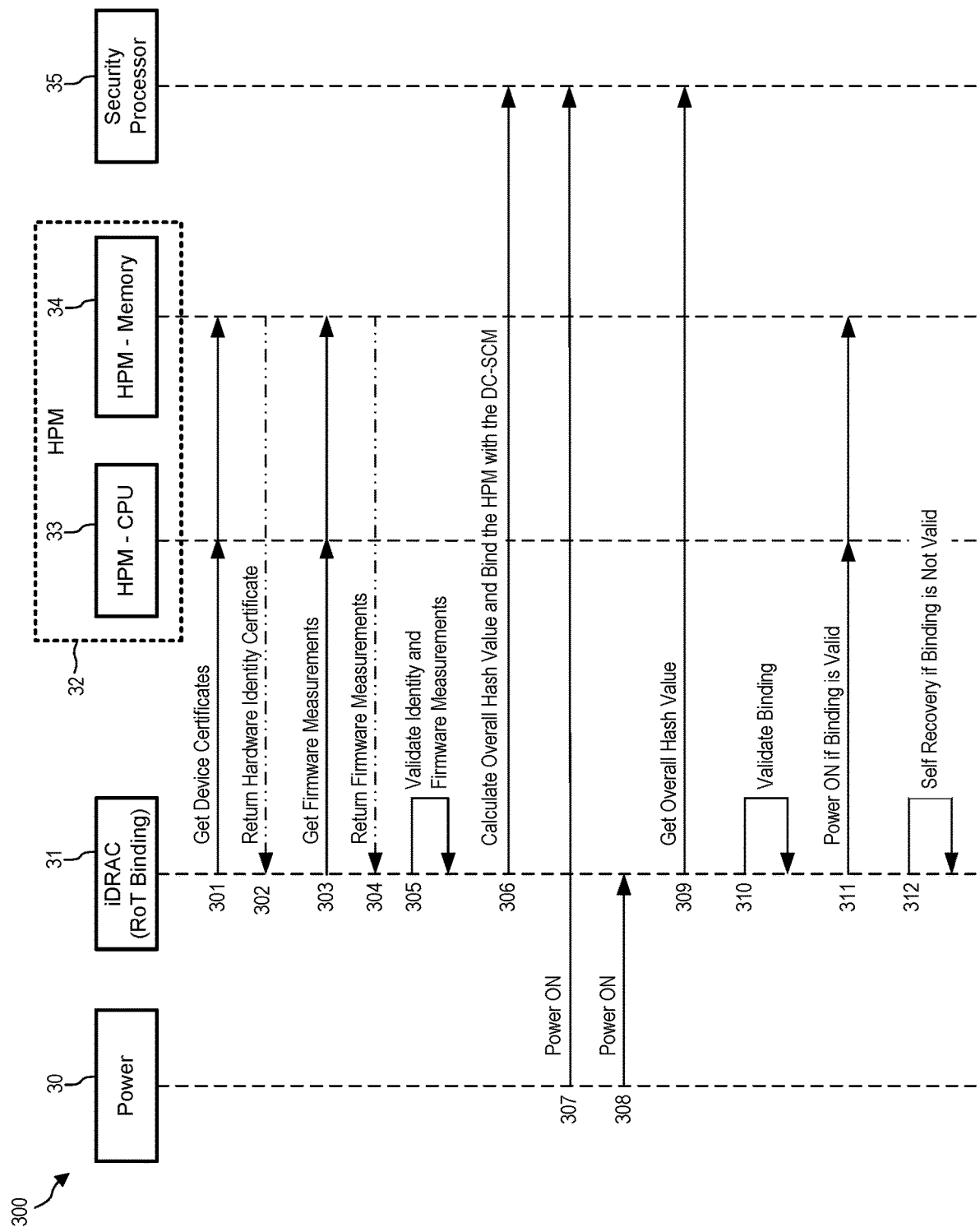
FIG. 3 illustrates a message flow 300 that is exchanged between baseboard management controller, host processor module components, and a security processor.

FIG. 3 illustrates a message flow that is exchanged between an iDRAC 31, HPM 32 components, such as a CPU 33 and memory 34, and a security processor 35. Messages 301-306 illustrate messages exchanged during the manufacturing process or initial OEM configuration, while the iDRAC 31 and associated DC-SCM are in a factory mode. In step 301, iDRAC 31 sends SPDM Get_Certificate request messages to all SPDM-capable HPM 32 devices, including CPU 33 and memory 34. In step 302, the hardware devices 32, 33 respond with SPDM Certificate response messages, which include hardware identity certificates.

In step 303, iDRAC 31 SPDM Get_Measurements request messages to the HPM 32 devices 32, 33. In step 302, devices 32, 33 respond with SPDM Measurements response messages, which include firmware measurements for all mutable firmware components that the HPM endpoint 32 is executing.

In step 305, iDRAC 31 validates the hardware identities and the firmware measurements received from CPU 33 and memory 34. In step 306, iDRAC 31 calculates an overall hash value for all of the hardware identity certificates and firmware measurements for CPU 33 and memory 34 and stores the hash value either locally or with security processor 35. This binds HPM 32 to the DC-SCM associated with iDRAC 31 and sets the system mode to HPM-to-DC-SCM BOUND mode and ends the factory mode.

After the system is installed at a customer site, such as a data center, steps 307-312 may be performed. In steps 307 and 308, power on messages are sent to security processor 35 and iDRAC 31. As part of the boot process, iDRAC 31 obtains hardware identity certificates and firmware measurements from hardware devices 33, 34 present on HPM 32. This may be accomplished using the same SPDM Get_Certificate and Get_Measurements request messages described above. iDRAC 208 recalculates the overall hash value and fetches the stored hash value in step 309 from security processor 34.

In step 310, iDRAC 31 determines whether both hash values match (i.e., factory hash value and recent power on hash value) and then validates the binding between the DC-SCM associated with iDRAC 31 and HPM 32. In step 311, if the binding is valid, then iDRAC 31 initiates power on for the HPM 32 components and allows the CPU 33 to boot.

If the DC-SCM associated with iDRAC 31 was inserted into a different HPM (not shown), then the hash values will not match and the HPM-to-DC-SCM binding will not be valid. In that case, iDRAC 31 prevents host operating system from booting and perform self-recovery actions in step 312. The self-recovery actions may be based on a user-configured security policy.

In one embodiment, an IHS comprises a first host processor module configured to host one or more processors and at least one memory device and a secure control module configured to host a baseboard management controller and a security processor. The baseboard management controller comprises at least one processor coupled to at least one storage device. The at least one storage device having program instructions stored thereon that, upon execution by the at least one processor, cause the baseboard management controller to execute a process to bind the first host processor module to the secure control module using a hash value calculated from characteristics of components of the first host processor module. The process to bind the first host processor module to the secure control module comprises retrieving hardware identity certificates from all SPDM-capable hardware devices in the first host processor module, retrieving firmware measurements from all SPDM-capable hardware devices in the first host processor module, calculating an initial hash value from the hardware identity certificates and the firmware measurements, and storing the initial hash value either in the baseboard management controller or in the security processor. The hardware identity certificates are retrieved using an SPDM Get_Certificate request message sent by the baseboard management controller, and the firmware measurements are retrieved using an SPDM Get_Measurements request message sent by the baseboard management controller.

Execution of the program instructions further cause the baseboard management controller to, after calculating the initial hash value, set a bound mode indicating that the secure control module is bound to the first host processor module. Execution of the program instructions further cause the baseboard management controller to, upon power-on of the IHS at a user site, retrieve hardware identity certificates and firmware measurements from SPDM-capable hardware devices in a current host processor module, recalculate a new hash value from the hardware identity certificates and the firmware measurements, retrieve the stored initial hash value from the baseboard management controller or the security processor, and determine whether the new hash value and the initial hash value match. Execution of the program instructions further cause the baseboard management controller to, if the new hash value and the initial hash value do match, then allow a host operating system of the IHS to boot. Execution of the program instructions further cause the baseboard management controller to, if the new hash value and the initial hash value do not match, then set an unbound mode indicating that the secure control module is not bound to a known host processor module and perform recovery actions. The recovery actions are based on a user-configured security policy.

Execution of the program instructions further cause the baseboard management controller to, if the new hash value and the initial hash value do not match, then perform one or more of the following actions prevent the IHS from booting, clear an assigned IHS license, set a base IHS license, erase some or all memory devices, clear server configuration settings, and clear identity module contents. The SPDM-capable hardware devices in the first host processor module comprise one or more of: a processor, a memory, and a smart device.

Execution of the program instructions further cause the baseboard management controller to perform the following recovery actions: encrypt current internal configuration data using a hardware identity certificate, and store encrypted configuration data at the baseboard management controller or at the security processor. Execution of the program instructions further cause the baseboard management controller to store the encrypted configuration data in an internal hidden memory partition of the baseboard management controller. The internal configuration data comprises one or more of credentials, licenses, personality modules, and security certificates.

Execution of the program instructions further cause the baseboard management controller to clear all internal configuration data and reset baseboard management controller configurations to default values.

Execution of the program instructions further cause the baseboard management controller to, upon power-on of the IHS after the secure control module has been reattached to the first host processor module: retrieve stored encrypted configuration data, decrypt the encrypted configuration data using the hardware identity certificate, restore the decrypted configuration data to hardware devices, and reset the bound mode indicating that the secure control module is bound to the first host processor module. The baseboard management controller determines that the secure control module has been reattached to the first host processor module if the new hash value matches the initial hash value.

In another arrangement, an IHS comprises a first SPDM-enabled device conforming to a SPDM specification. The first SPDM-enabled device comprises at least one processor coupled to at least one storage, the at least one storage having program instructions stored thereon that, upon execution by the at least one processor, cause the IHS to, upon power-on of the IHS, retrieve hardware identity certificates and firmware measurements from SPDM-capable hardware devices in a current host processor module, calculate a new hash value from the hardware identity certificates and the firmware measurements, retrieve a stored initial hash value, and determine whether the new hash value and the initial hash value match. Execution of the program instructions further cause the IHS to, if the new hash value and the initial hash value do match, then allow a host operating system to boot; and if the new hash value and the initial hash value do not match, then set an unbound mode indicating that the secure control module is not bound to a known host processor module and perform recovery actions.

Execution of the program instructions further cause the IHS to encrypt current internal configuration data using a hardware identity certificate, store encrypted configuration data in an internal hidden memory partition of the baseboard management controller or at the security processor, clear all internal configuration data, and reset baseboard management controller configurations to default values.

In another embodiment, an IHS comprises a first SPDM-enabled device conforming to a SPDM specification. The first SPDM-enabled device comprises at least one processor coupled to at least one memory, the at least one memory having program instructions stored thereon that, upon execution by the at least one processor, cause the IHS to determine that a secure control module has been attached to a known host processor module based upon a calculated hardware-based hash value matching a stored hash value, retrieve stored encrypted configuration data, decrypt the encrypted configuration data using a hardware identity certificate, restore the decrypted configuration data to hardware devices, and reset a bound mode indicating that the secure control module is bound to the known host processor module.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. An Information Handling System (IHS), comprising:
a first host processor module configured to host one or more processors and at least one memory device;
a secure control module configured to host a baseboard management controller and a security processor; and
wherein the baseboard management controller comprises at least one processor coupled to at least one storage device, the at least one storage device having program instructions stored thereon that, upon execution by the at least one processor, cause the baseboard management controller to:
execute a process to bind the first host processor module to the secure control module using a hash value calculated from characteristics of components of the first host processor module, the process to bind the first host processor module to the secure control module comprising:
retrieving hardware identity certificates from all Security Protocol and Data Model (SPDM)-capable hardware devices in the first host processor module;
retrieving firmware measurements from all SPDM-capable hardware devices in the first host processor module;
calculating an initial hash value from the hardware identity certificates and the firmware measurements; and
storing the initial hash value either in the baseboard management controller or in the security processor.

2. The IHS of claim 1, wherein the hardware identity certificates are retrieved using an SPDM Get_Certificate request message sent by the baseboard management controller; and
the firmware measurements are retrieved using an SPDM Get_Measurements request message sent by the baseboard management controller.

3. The IHS of claim 1, wherein execution of the program instructions further cause the baseboard management controller to:
after calculating the initial hash value, set a bound mode indicating that the secure control module is bound to the first host processor module.

4. The IHS of claim 1, wherein execution of the program instructions further cause the baseboard management controller to:
upon power-on of the IHS at a user site, retrieve hardware identity certificates and firmware measurements from SPDM-capable hardware devices in a current host processor module;
recalculate a new hash value from the hardware identity certificates and the firmware measurements;
retrieve the stored initial hash value from the baseboard management controller or the security processor; and
determine whether the new hash value and the initial hash value match.

5. The IHS of claim 4, wherein execution of the program instructions further cause the baseboard management controller to:
if the new hash value and the initial hash value do match, then allow a host operating system of the IHS to boot.

6. The IHS of claim 4, wherein execution of the program instructions further cause the baseboard management controller to:
if the new hash value and the initial hash value do not match, then
set an unbound mode indicating that the secure control module is not bound to a known host processor module; and
perform recovery actions.

7. The IHS of claim 6, wherein the recovery actions are based on a user-configured security policy.

8. The IHS of claim 4, wherein execution of the program instructions further cause the baseboard management controller to:
if the new hash value and the initial hash value do not match, then perform one or more of the following actions: prevent the IHS from booting, clear an assigned IHS license, set a base IHS license, erase some or all memory devices, clear server configuration settings, and clear identity module contents.

9. The IHS of claim 1, wherein the SPDM-capable hardware devices in the first host processor module comprise one or more of: a processor, a memory, and a smart device.

10. The IHS of claim 6, wherein execution of the program instructions further cause the baseboard management controller to perform the following recovery actions:
encrypt current internal configuration data using a hardware identity certificate; and
store encrypted configuration data at the baseboard management controller or at the security processor.

11. The IHS of claim 10, wherein execution of the program instructions further cause the baseboard management controller to:
store the encrypted configuration data in an internal hidden memory partition of the baseboard management controller.

12. The IHS of claim 10, wherein the internal configuration data comprises one or more of credentials, licenses, personality modules, and security certificates.

13. The IHS of claim 10, wherein execution of the program instructions further cause the baseboard management controller to:
clear all internal configuration data; and
reset baseboard management controller configurations to default values.

14. The IHS of claim 10, wherein execution of the program instructions further cause the baseboard management controller to, upon power-on of the IHS after the secure control module has been reattached to the first host processor module:
retrieve stored encrypted configuration data;
decrypt the encrypted configuration data using the hardware identity certificate;
restore the decrypted configuration data to hardware devices; and
reset the bound mode indicating that the secure control module is bound to the first host processor module.

15. The IHS of claim 10, wherein the baseboard management controller determines that the secure control module has been reattached to the first host processor module if the new hash value matches the initial hash value.

16. An Information Handling System (IHS) comprising:
a first Security Protocol and Data Model (SPDM)-enabled device conforming to a SPDM specification, wherein the first SPDM-enabled device comprises at least one processor coupled to at least one storage device, the at least one storage device having program instructions stored thereon that, upon execution by the at least one processor, cause the IHS to:
upon power-on of the IHS, retrieve hardware identity certificates and firmware measurements from SPDM-capable hardware devices in a current host processor module;
calculate a new hash value from the hardware identity certificates and the firmware measurements;
retrieve a stored initial hash value;
determine whether the new hash value and the initial hash value match;
if the new hash value and the initial hash value do match, then allow a host operating system to boot; and
if the new hash value and the initial hash value do not match, then:
set an unbound mode indicating that a secure control module is not bound to a known host processor module; and
perform recovery actions.

17. The IHS of claim 16, wherein execution of the program instructions further cause the IHS to:
- encrypt current internal configuration data using a hardware identity certificate;
- store encrypted configuration data in an internal hidden memory partition of a baseboard management controller or a security processor;
- clear all internal configuration data; and
- reset baseboard management controller configurations to default values.

18. An Information Handling System (IHS) comprising:
a first Security Protocol and Data Model (SPDM)-enabled device conforming to a SPDM specification, wherein the first SPDM-enabled device comprises at least one processor coupled to at least one memory, the at least one memory having program instructions stored thereon that, upon execution by the at least one processor, cause the IHS to:
- determine that a secure control module has been attached to a known host processor module based upon a calculated hardware-based hash value matching a stored hash value;
- retrieve stored encrypted configuration data;
- decrypt the encrypted configuration data using a hardware identity certificate;
- restore the decrypted configuration data to hardware devices; and
- reset a bound mode indicating that the secure control module is bound to the known host processor module.

* * * * *